Figure 1:
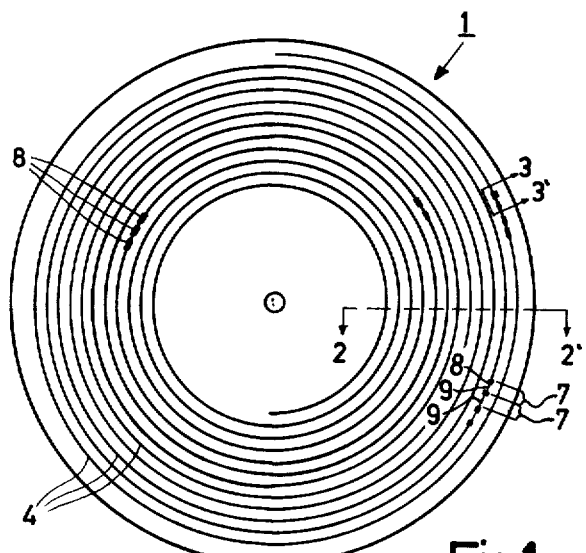

United States Patent [19]

Kleuters et al.

[11] 4,363,116
[45] Dec. 7, 1982

[54] METHOD, APPARATUS AND RECORD CARRIER BODY FOR OPTICALLY WRITING INFORMATION

[75] Inventors: Wilhelm J. Kleuters; Gerrit B. Gerritsen; Johannes J. Verboom, all of Eindhoven, Netherlands

[73] Assignee: U.S. Philips Corporation, New York, N.Y.

[21] Appl. No.: 140,409

[22] Filed: Apr. 14, 1980

Related U.S. Application Data

[63] Continuation of Ser. No. 925,229, Jul. 17, 1978, abandoned.

[30] Foreign Application Priority Data

Mar. 16, 1978 [NL] Netherlands ............... 7802859

[51] Int. Cl.³ .............. G11B 7/00; G11B 21/08; G11B 21/10
[52] U.S. Cl. ..................... 369/30; 369/44; 369/45; 369/47; 369/275; 360/72.2; 360/77; 358/342
[58] Field of Search .......... 250/201, 202; 360/72.2, 360/73, 77; 365/215, 234; 346/76 L; 358/128.5, 128.6; 369/44, 45, 30, 41, 47, 48, 111, 53-58, 95, 275, 284, 277, 278, 279

[56] References Cited

U.S. PATENT DOCUMENTS

| | | | |
|---|---|---|---|
| 3,431,513 | 3/1969 | Nonnichi | 369/122 |
| 3,696,344 | 10/1972 | Feinleib | 350/160 R |
| 3,789,378 | 1/1974 | Bonzono | 360/77 |
| 3,866,238 | 2/1975 | Monroe | 346/76 L |
| 3,931,457 | 1/1976 | Mes | 360/72.2 |
| 3,931,460 | 1/1976 | Watson | 369/44 |
| 3,941,945 | 3/1976 | Borner | 369/122 |
| 3,999,008 | 12/1976 | Bouwhuis | 369/45 |
| 4,001,493 | 1/1977 | Lone | 369/275 |
| 4,051,329 | 9/1977 | Blondet | 358/127 |
| 4,057,831 | 11/1977 | Jacobs | 369/109 |
| 4,094,010 | 6/1978 | Pepperl | 358/128.5 |
| 4,094,013 | 6/1978 | Hill | 358/128.5 |
| 4,223,347 | 9/1980 | Bouwhuis | 369/44 |

FOREIGN PATENT DOCUMENTS 1499422 10/1973 Fed. Rep. of Germany ...... 369/121

OTHER PUBLICATIONS

"A Random Access System Adapted for the Optical Videodisc: Its Impact on Information Retrieval", by M. Mathieu, Journal of SMPTE, Feb., 1977, vol. 86, pp. 80–83.
"Optical Readout of Videodisc", by Bricot et al., Nov., 1976, pp. 304–308 of IEEE Transactions on Consumer Electronics.
"Nachrichtentechnische Zeitschrift", ©1970, No. 1, pp. 11–16 by Appel et al.

*Primary Examiner*—Bernard Konick
*Assistant Examiner*—Alan Faber
*Attorney, Agent, or Firm*—Thomas A. Briody; Robert T. Mayer; Algy Tamoshunas

[57] ABSTRACT

Disclosed is a method and apparatus for recording information on a disc-shaped record carrier body with a single beam of radiation. The record carrier body is provided with a servo track which preferably exhibits a phase structure and which contains a multitude of sector addresses each associated with a portion provided with a radiation sensitive layer. Before the information is recorded, the beam is switched to a low, read level and the desired address is located. Simultaneously, the radial position and tangential speed of the radiation spot and the focusing of the radiation beam are checked. Once the desired address is located, the beam is switched to a higher, write intensity and the information is recorded on the radiation sensitive layer of the portion associated with that address. During recording, the radiation returning from the record carrier can be used to check whether the information is recorded correctly. During reading of the recorded information, the servo track may be used for positioning the radiation spot on the information track.

21 Claims, 17 Drawing Figures

METHOD, APPARATUS AND RECORD CARRIER BODY FOR OPTICALLY WRITING INFORMATION

This is a continuation of application Ser. No. 925,229, filed July 17, 1978 now abandoned.

The invention relates to a method of writing information in an information layer of a record carrier body in the form of optically detectable information areas arranged along generally parallel tracks. The information may be read with the aid of a radiation beam which is focussed to a single radiation spot on the information layer. Upon relative movement between the information layer the radiation spot, the intensity of the radiation beam is switched in accordance with the information to be written between a first (write) level, which produces an optically detectable change in the information layer, and a second (read) level, which produces no detectable change, with the radiation spot following a servo track provided in the information layer.

The invention also relates to an apparatus for carrying out the method, to a record carrier body on which information is recorded in accordance with the method, and to a record carrier provided with information in accordance with the method.

The record carrier body may be comprised of a disc-shaped substrate supporting a radiation sensitive information layer in which a radiation beam of sufficiently high intensity can produce an optically detectable change. The record carrier body is provided with an optically detectable servo track which extends over the entire surface area of the record carrier body. The servo track is preferably a spiral track, but it may alternatively comprise a multitude of concentric subtracks. The servo track enables the radial position of the radiation spot formed on the information layer by the radiation beam to be controlled.

A record carrier is to be understood to mean a record carrier body which has been provided with information to be utilized by the user, which information has been recorded by this user.

A radiation beam is to be understood to mean a beam of electromagnetic radiation of a wavelength situated in the wavelength range from infrared to ultraviolet.

The information areas have, for example, standard dimensions and alternate with intermediate areas. The information areas differ from the intermediate areas and from the lands between the tracks in that they have for example a different coefficient of transmission or reflection. A specific sequence of areas and intermediate areas may, for example, represent a certain combination of digital zeros and digital ones.

It has been proposed previously to record a television program in a round disc-shaped record carrier by the provision of optically detectable areas arranged in tracks, with the spatial frequencies and the lengths of the areas representing the information. Since such an optical record carrier has a high information density and a short access time an since during reading there is no mechanical contact between the optical read head and the record carrier and consequently no wear, the record carrier is also highly suitable as a storage medium for information other than video information, and in particular as a storage medium in which the user himself can record information. Examples of this are the recording of information supplied by an (office) computer or of x-ray plates made in a hospital.

The techniques and equipment proposed for the distribution of television programs via an optical record carrier are not readily suitable for professional and semiprofessional applications in which the user records his own information.

First of all, when a television program is written in a record carrier body, the entire program is written sequentially. However, when the record carrier is used as a storage medium, the user should have the freedom of writing a certain block of information at an arbitrary location in the information layer.

Furthermore, when a television program is recorded the very small information details, having a width of for example 0.5 $\mu$m and an average length of for example 0.5 $\mu$m, should be written on a blank record carrier body with a very high accuracy in a spiral track with a constant pitch of for example 1.6 $\mu$m. This means that the speed with which the record carrier is rotated should be highly constant, and that the write spot should be moved accurately in the track direction and transversely to the track direction. The write apparatus accordingly requires very accurate drive and guide mechanisms making it expensive.

An accurate and expensive write apparatus is not prohibitive when an optical record carrier is used as a transmission medium for television programs. Indeed, with a single write apparatus a large number of different television programs can be written centrally in so-called "master" discs. From one master disc a very large number of pressings can be made, using techniques similar to those used in the manufacture of audio records. In the case of professional or semiprofessional use of the record carrier, when the user himself records the information, an expensive write apparatus is prohibitive, because each user should have such an apparatus at his disposal.

In U.S. patent application Ser. No. 127,354, filed Mar. 5, 1980, now abandoned, it has been proposed to provide a record carrier body with a so-called follow-on track. This follow-on track is a continuous and optically detectable track. When the information is written, the radial position of the write spot relative to the follow-on track is detected and corrected with the aid of two additional radiation spots which are locked to the write spot. For the formation of the two additional radiation spots additional optical means are required in the read apparatus.

It is the object of the present invention to combine a number of steps which are known per se in such a way that an optical record carrier is rendered suitable as a storage medium and which enables very accurate recording of information by the user himself with simple apparatus. The invention is embodied in the record carrier body which is used, the method used for recording on said record carrier body, and the apparatus for carrying out this method.

The method in accordance with the invention is characterized in that before a specific block of information is written in a specific part of the information layer, the address of the part to be written is detected with the radiation spot whose intensity has been switched to the second level and simultaneously it is checked whether the center of the radiation spot coincides with the average position of the center line of the servo track. During writing of the information block, the radiation spot is used to check whether the center of the radiation spot coincides with the average position of the center line of the servo track.

An information block is to be understood to mean a certain number of information characters which together constitute one unit, such as a word, a line or a number of lines of a printed document.

The method in accordance with the invention utilizes only one radiation spot for reading the addresses, for following the servo track, and for writing the information areas.

During writing, the speed in the track direction with which the information layer moves relative to the radiation spot can be controlled by measuring the speed of the drive motor and, as the case may be, correcting this speed. A more accurate control of the speed of the information layer relative to the radiation spot in the track direction is possible by the use of the tracking information which is contained in the servo track and is readable by means of the radiation spot. The method in accordance with the invention is then characterized in that during reading of a sector address on the record carrier body the speed with which the sector address is read is measured and used for controlling the rate at which the information to be written is applied. This rate of application can be controlled by controlling an electronic clock which determines the frequency with which the information to be written is applied.

The portions of the servo track between the sector addresses may comprise continuous and optically detectable track portions. However, it is alternately possible that between the sector addresses there are situated only tracking areas of uniform dimensions at a mutual distance which is substantially greater than the dimensions of the tracking areas. With the aid of these tracking areas it is possible to ascertain whether the center of the radiation spot coincides with the average position of the center line of the servo track.

If the tracking areas comprise a plurality of synchronizing areas, the method in accordance with the invention may further be characterized in that the speed with which the radiation spot moves relative to the synchronizing areas is measured and is used for controlling the rate at which the information to be written is applied. It is then also possible to derive a signal for correcting the speed with which the information is written in the time interval in which the radiation spot moves from a first sector address to a second sector address.

The synchronizing areas of a tracking area produce a certain clock frequency during reading. It is insured that this clock frequency corresponds to the clock frequency of the said electronic clock.

When the information layer of the record carrier body is made of a material which upon exposure to a sufficiently high intensity is immediately subject to an optically detectable change, the radiation spot can moreover be employed to check whether the information is being written correctly during recording of a block of information. For this purpose the method in accordance with the invention is further characterized in that during writing of a block of information the variation in intensity of the radiation beam coming from the information layer is used as a means of detecting the information areas just written, and that the resulting signal is compared with the information which is applied so as to be written.

The write operation takes up only a very small fraction of the time and the areas to be written are formed in a very short time. As a result of this an area just written is still partly situated underneath the radiation spot which has been switched to read intensity, so that this area can be detected as being written or not immediately after writing. This enables the detection of errors, which are not corrected by the coding and modulating system which is used. If a block of recorded information contains such an error, then it is decided to re-write the block of information. If such an error does not occur, it is decided to record a subsequent information block.

It is to be noted that it is known per se from U.S. Pat. No. 3,696,344 to employ the write beam which passes through the record carrier for checking the write process in writing optically detectable information areas in a semiconductor layer. However, the intensity of the last-mentioned beam is compared with that of a beam which is passed through a part of a blank record carrier body. Furthermore, the method of writing in accordance with U.S. Pat. No. 3,696,344 does not employ the write spot of radiation for reading addresses or for tracking purposes.

The information transfer rate that can be achieved when an optical record carrier is used is determined by the maximum frequency with which the radiation intensity can be switched and by the product of the minimum speed with which the track moves relative to the radiation spot and the maximum spatial frequency of the areas that can still be detected. The maximum information transfer rate is high, for example 30 MHz, but for certain applications, for example for the transmission of X-ray images, it may still be inadequate. When an optical record carrier is used the information transfer rate can be increased substantially if the method in accordance with the invention is further characterized in that during writing a number of additional radiation spots are projected adjacent each other and between two adjacent servo track portions, the intensities of said radiation spots being switched individually and in accordance with the information to be written, so that simultaneously the information is written in a plurality of information tracks between the adjacent servo track portions, apart from in the servo track.

It is to be noted that it is known from German Patent Specification No. 1,499,422 to record a plurality of information tracks at the same time using a plurality of radiation spots. However, in that case none of the radiation spots is also used for reading addresses and for checking the position of the radiation spot relative to the track.

When using the method in accordance with the invention a special record carrier body is employed which is provided with a servo track. A first embodiment of a record carrier body in accordance with the invention in characterized in that the servo track comprises continuous optically detectable portions which alternate with sector addresses, the address of the associated continuous portion of the servo track being encoded in address areas in each sector address, and that there are provided a multitude of sector addresses per revolution of the servo track. The sector addresses, in addition to the track number (or the number of the revolution of a spiral servo track) for example also contain the number of the relevant sector in said track (or in said revolution). In addition, a number of synchronizing areas may be provided at the beginning of each sector address, which areas during reading produce a clock regeneration signal which dictates the clock frequency of the electronic clock which determines the frequency with which the information to be written is applied.

The servo track may have an amplitude structure, i.e. it influences the amplitude of an incident radiation beam in a different way than the rest of the information layer. The address and synchronizing areas then have a different coefficient of reflection or absorption than the rest of the servo track. Preferably, the servo track has a phase structure, so that a part of the radiation beam which is incident on this track will have a different phase than a part of the radiation beam which is incident beside the servo track. In the last-mentioned case the address and synchronizing areas are situated at a higher or lower level than the rest of the servo track. Furthermore, the information layer may be a reflecting layer or a radiation transmitting layer.

In accordance with a further characteristic feature of a record carrier body the servo track is a periodically undulating track, the phase of the undulation being related to the beginning of a sector address. The amplitude of the undulation is smaller than the width of the servo track, and an integral number of periods of the undulation is contained in the length of the sector addresses.

By the use of an undulating servo track both the magnitude and the direction of a deviation between the center of the radiation spot and the average position of the center line of the servo track can be determined in a simple manner. The servo track undulation may also be used during subsequent reading of the record carrier.

A second embodiment of a record carrier body in accordance with the invention is characterized in that the servo track contains sector addresses and that the parts between the sector addresses comprise optically detectable tracking areas, at a constant mutual distance which is substantially greater than the length of the tracking areas, the space between the tracking areas being intended to be provided with information.

These tracking areas may be used for controlling the position of the radiation spot relative to the middle of the servo track.

In accordance with a further characteristic feature the tracking areas comprise synchronizing areas. These last-mentioned areas have the same function as the synchronizing areas at the beginning of the sector addresses.

A further embodiment of a record carrier body is characterized in that the distance between two adjacent portions of the servo track is several times the servo track width, so that a plurality of information tracks can be written between the said servo track portions.

A record carrier in which information has been written in accordance with a track using the inventive method, is characterized in that the track comprises a multitude of sector addresses per revolution, which sector addresses comprise a plurality of address areas. The address areas and the track portions between the sector addresses have a phase structure. The information is contained in the track portions between the sector addresses in the form of an amplitude structure.

An apparatus for writing in a record carrier body in accordance with the inventive method, and for reading a record carrier comprises a radiation source and means for switching the intensity of the radiation beam produced by the source between a first (write) level and a second (read) level. An objective system focusses the radiation beam to a single radiation spot on the information layer of the record carrier body, or the record carrier respectively and the radiation spot and the information layer are moved relative to each other. A detector detects the intensity of the radiation beam coming from the information layer. The output of the detector is connected to an electronic circuit arrangement having a first circuit which is connected to the detector for the conversion of the detector signal into an address signal and an information signal. This circuit is connected to a first address register, which in turn is connected to the input of a first comparison circuit. A second input of the comparison circuit is connected to a second address register for the desired address. The electronic circuit arrangement further comprises a second circuit, which is connected to the detector via a low-pass filter, for deriving a control signal for the position of the radiation spot transverse to the track direction, and a third circuit for deriving a control signal for the focussing of the radiation beam on the information layer.

The apparatus in accordance with the invention may be provided with means for checking the recorded information during writing comprised of the first circuit whose input is connected to a normalizing circuit. A first input of the normalizing circuit is connected to the detector, while a second input receives a signal which provides an indication of the intensity of the radiation emitted by the radiation source. The apparatus further includes a memory which is connected to the output of the first circuit, and a comparison circuit having a first input connected to the last-mentioned memory and a second input connected to a memory in which the block of information to be written is stored.

The radiation source may be a gas laser, such as a helium-neon laser. Preferably, the radiation source is a semiconductor diode laser. The intensity of the radiation beam which has been reflected by the information layer can then be determined with a radiation-sensitive detector which is disposed on the side of the diode laser which faces away from the record carrier. In last-mentioned case the intensity of the radiation emitted by the diode laser can be determined by measuring the electric current through the diode laser. Thus, the optical system of the apparatus is simplified considerably.

An even simpler apparatus in respect of the optical system is characterized in that the detector is constituted by an electronic circuit for determining the electrical resistance of the diode laser and that a signal which is proportional to the electric current through the diode laser is applied to the second input of the normalizing circuit.

An apparatus in accordance with the invention which is adapted to write information simultaneously in the servo tracks and in one or more information tracks, is characterized in that there is provided a number of additional radiation sources, each radiation source being provided with means for switching the intensity of the radiation beam emitted by said radiation source between a first (write) level and a second (read) level, and that there is provided an equal number of detectors, each additional radiation source being optically coupled to one detector.

Figure 3:
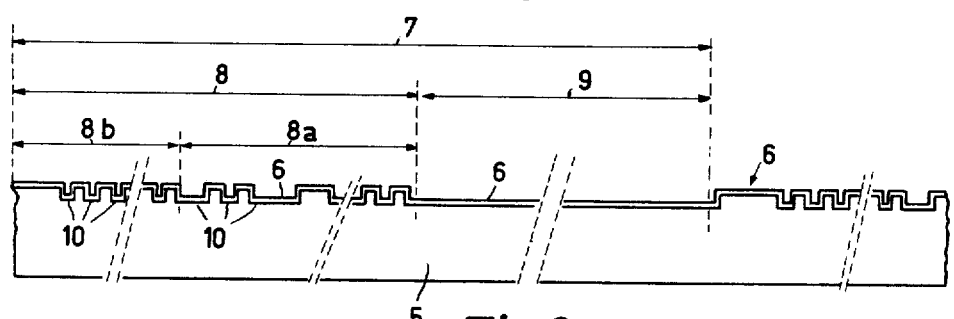
Figure 4:
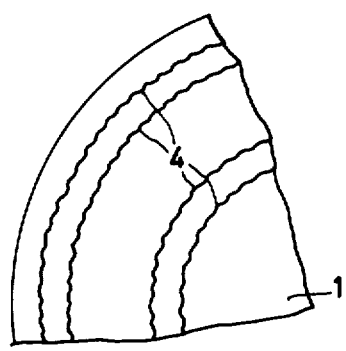
Figure 5:
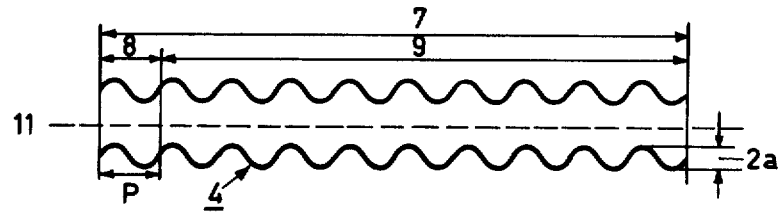
Figure 6A:
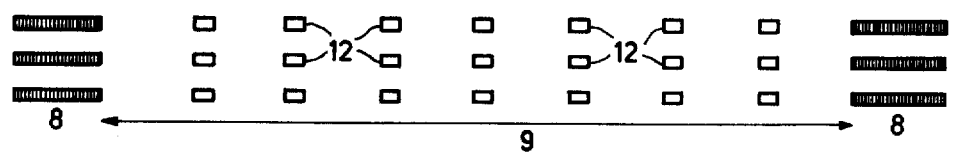
Figure 6B:
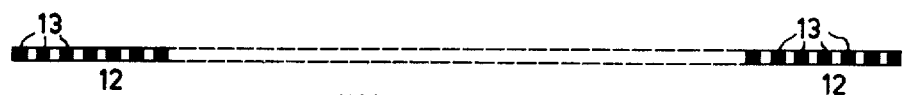
Figure 7:
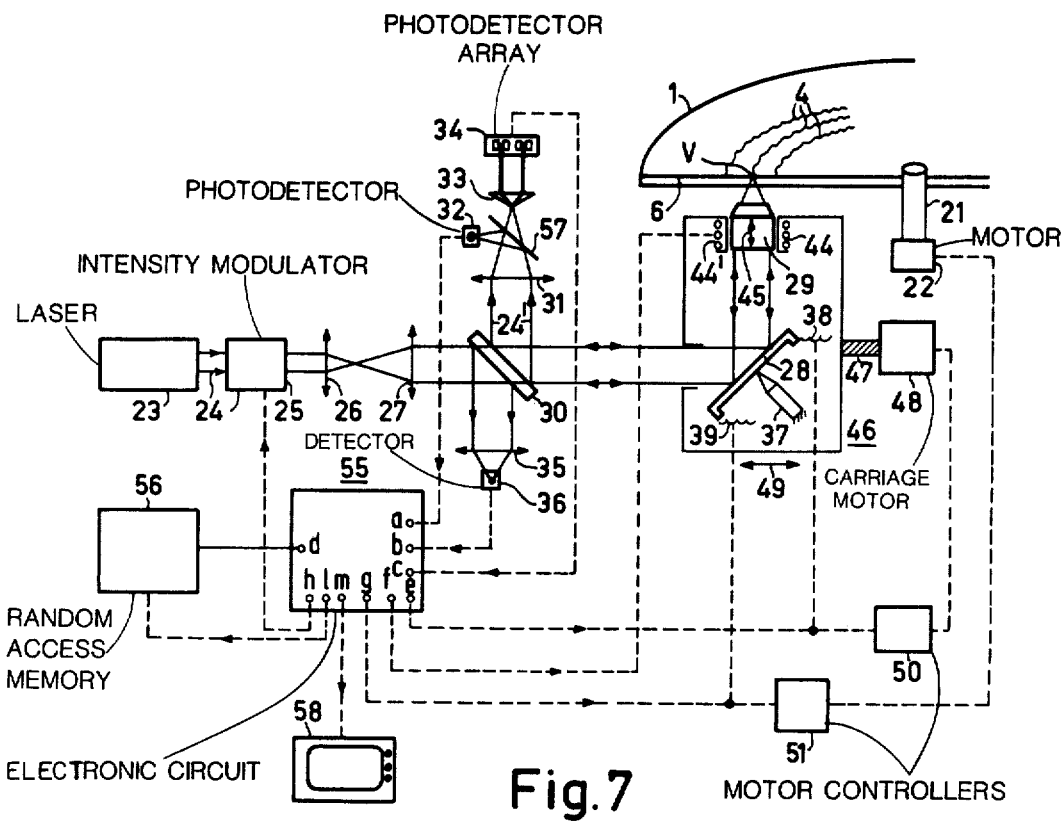
Figure 9:
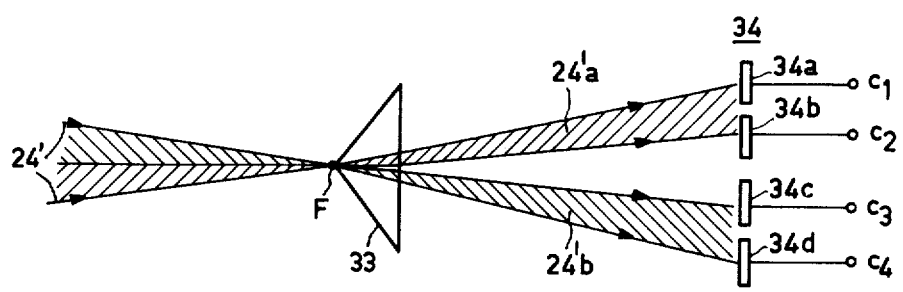
Figure 8:
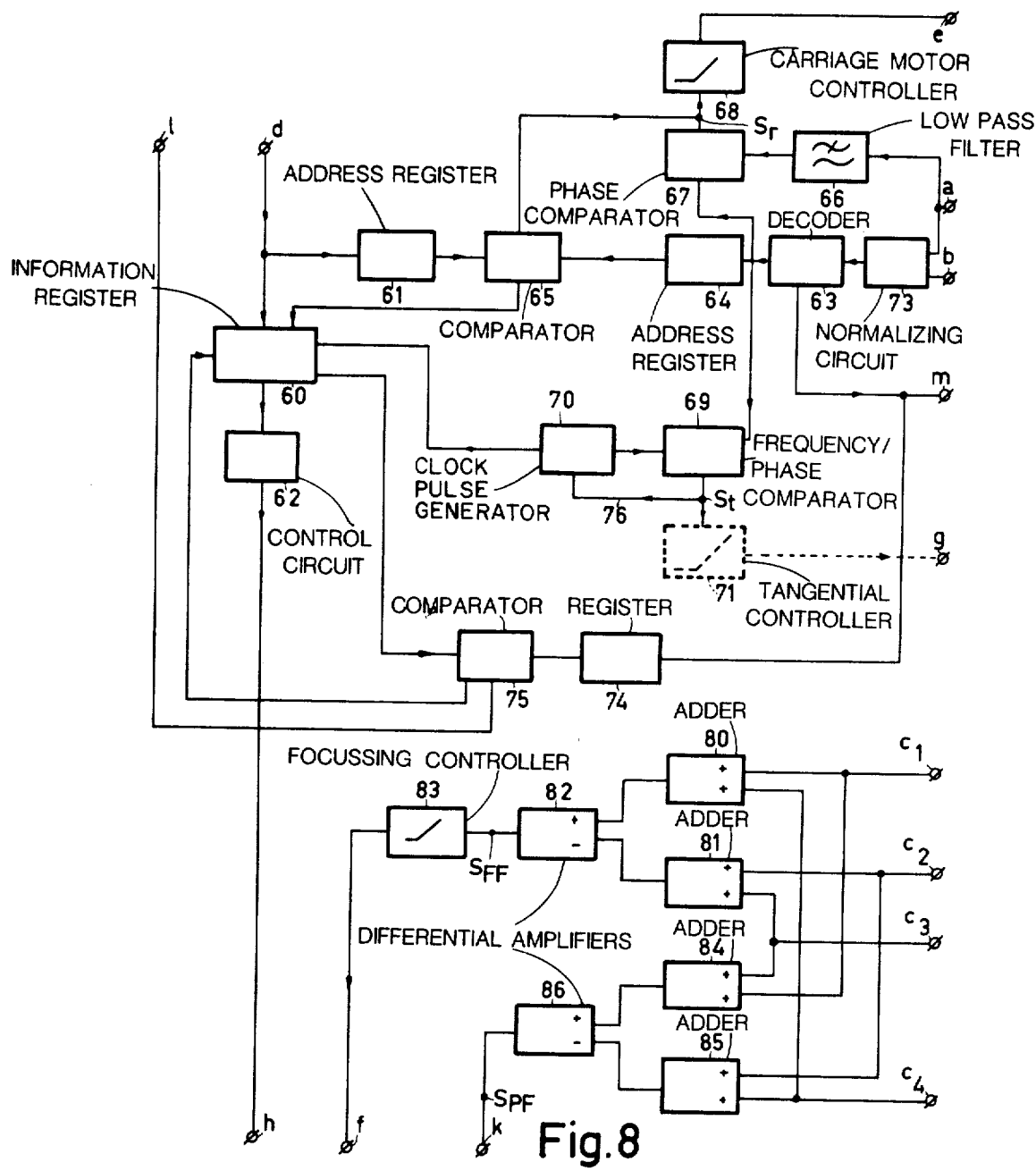
Figure 10:
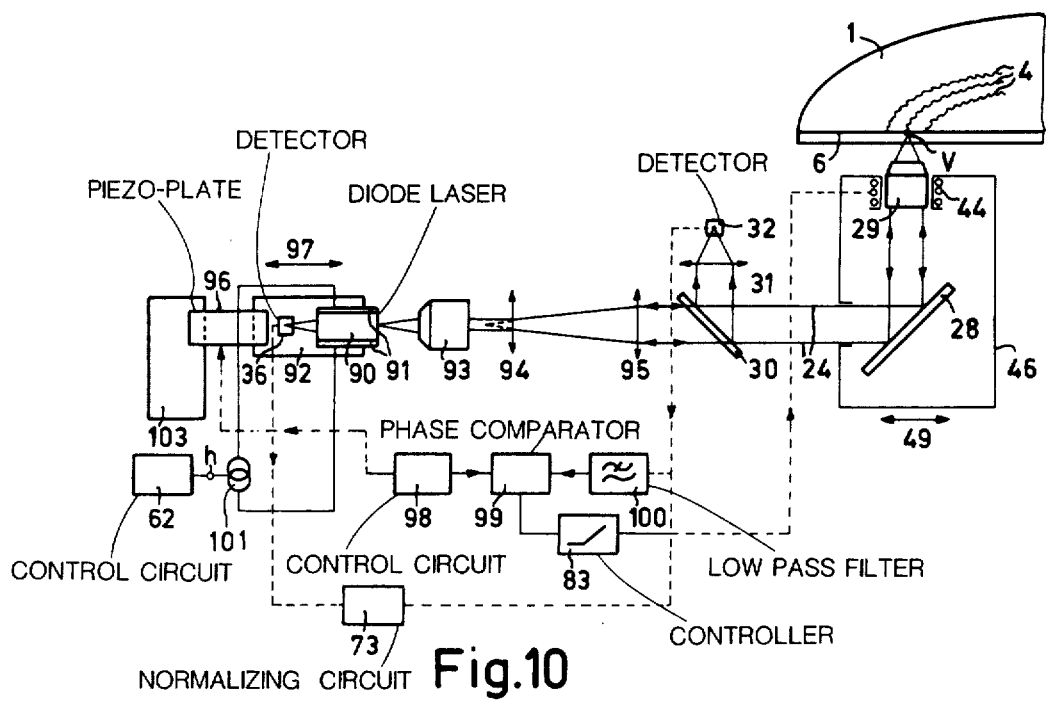
Figure 11:
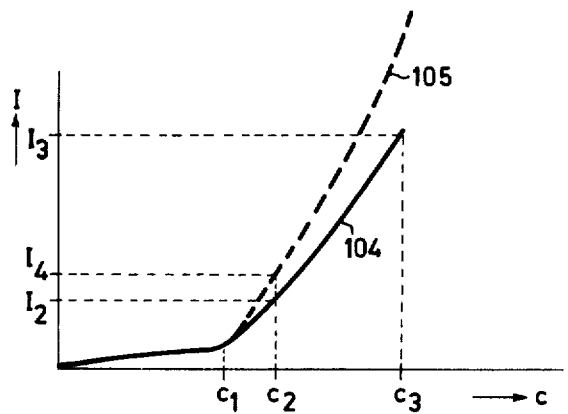
Figure 12:
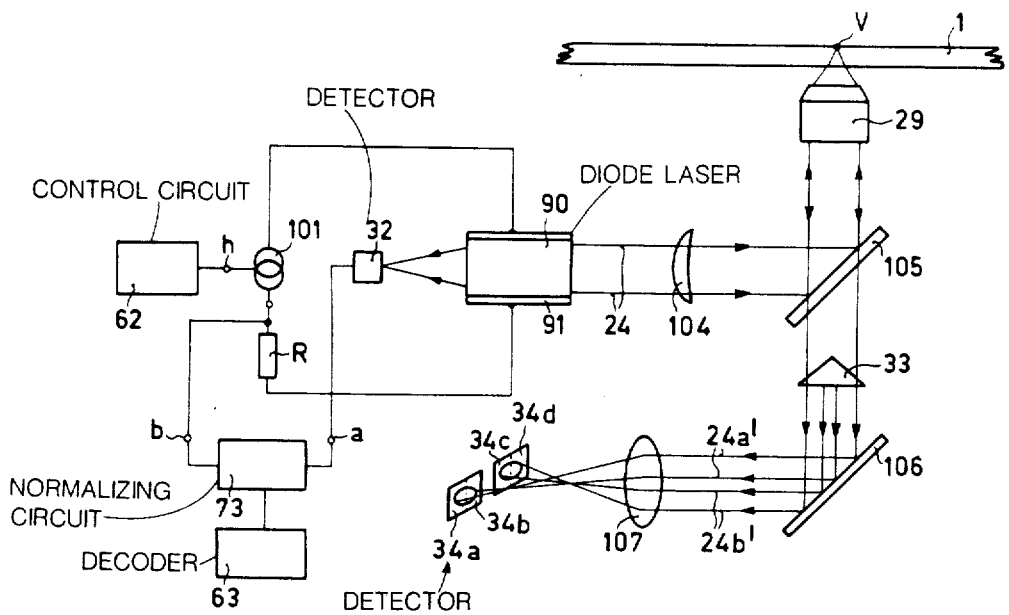
Figure 13:
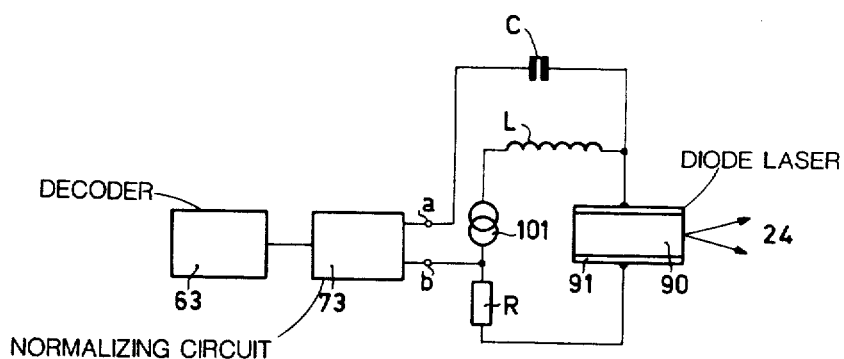
Figure 14:
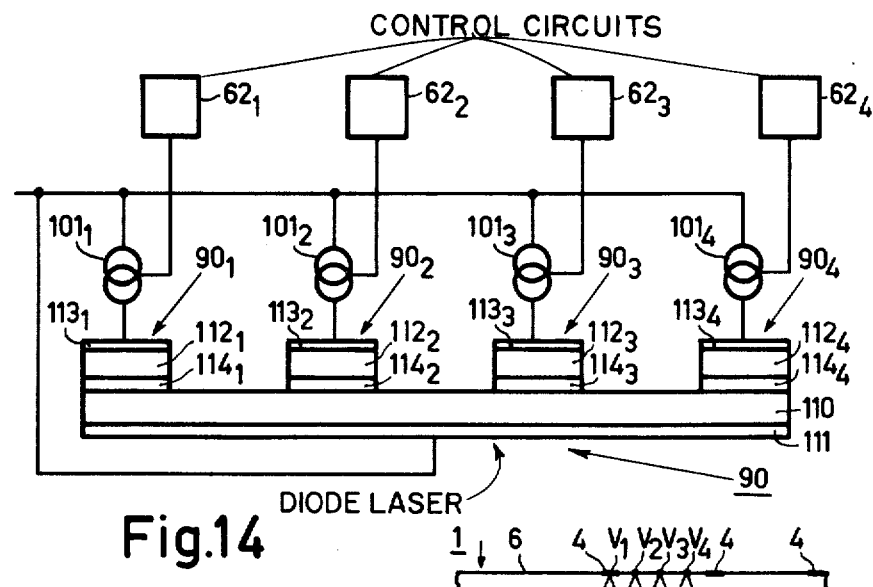
Figure 15:
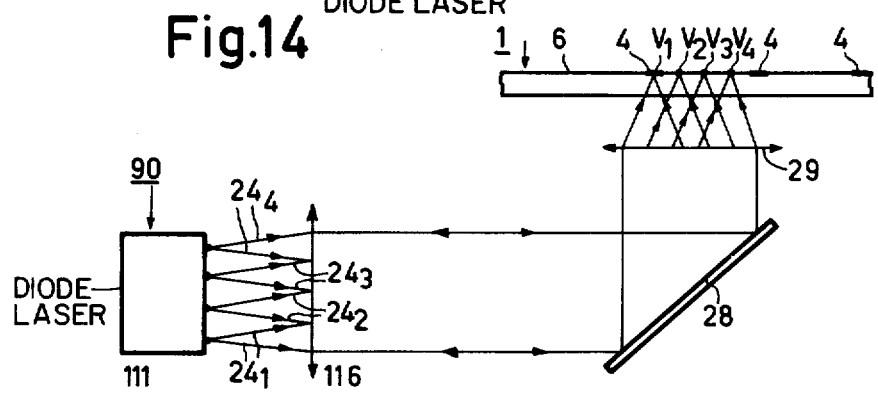
Figure 16:
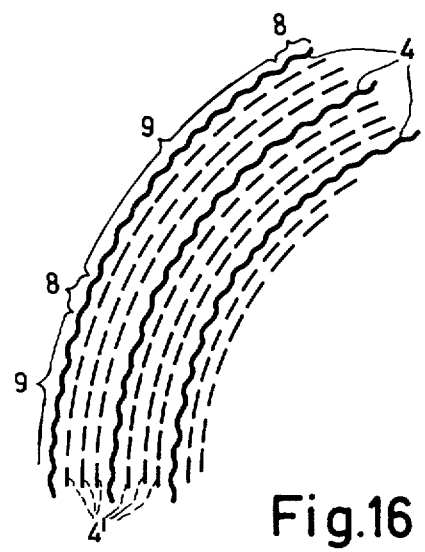

The invention will now be described in more detail with reference to the drawing. In the drawing FIG. 1 is in plan view embodiment of a record-carrier body, FIG. 2 shows a part of this record-carrier body in radial cross-section, FIG. 3 shows a part of the servo track of this record-carrier body in tangential cross-section, FIG. 4 shows a part of a record carrier body with an undulating servo track, FIG. 5 shows a part of the undulating servo track, FIGS. 6a and 6b shows a part of further embodiments of a record carrier body in accordance with the invention, FIG. 7 schematically shows a write-read apparatus in accordance with the invention, using a gas laser as radiation source, FIG. 8 shows the electronic system for said apparatus in block-schematic form, FIG. 9 shows an example of a system for detecting focussing errors, FIG. 10 shows a first embodiment of a write-read apparatus using a diode laser as radiation source, FIG. 11 represents the variation of the radiation intensity emitted by the diode laser as a function of the electric current through the diode laser, FIG. 12 shows a second embodiment of a write-read apparatus using a diode laser as radiation source, FIG. 13 shows a part of a write-read apparatus using no separate radiation-sensitive detectors, FIG. 14 shows a composite diode laser for simultaneously writing and reading a plurality of tracks, FIG. 15 schematically shows an apparatus for simultaneously writing and reading a plurality of tracks, FIG. 16 shows a record carrier which has been written-in by means of the apparatus in accordance with FIG. 15, In these Figures similar elements always bear the same reference numerals.

FIG. 1 shows a plan view of an embodiment of a record carrier body 1 used in conjunction with the method in accordance with the invention. The carrier body is provided with, for example, a spiral servo track 4. In accordance with the invention the servo track is divided into a multitude of sectors 7, for example 128 per revolution. Each sector comprises a continuous track portion 9, which during writing is used for recording the information on the record carrier body in accordance with a well-defined path, and a sector address 8 in which inter alia the address of the associated track portion 9 is digitally coded in address areas. Both the address areas and the track portions 9 should be optically detectable. The information is written between the sector addresses 8 and substantially in the track portions 9. The record carrier body is provided with a layer of a material which, upon exposure to suitable radiation, undergoes an optically detectable change.

It is possible to coat only the servo track 4 or only the track portions 9 with a highly-reflecting material. The servo track then has an amplitude structure. Information is recorded by locally changing the coefficient of reflection by means of radiation which has been switched to write intensity. Preferably, the areas of the sector addresses 8 are pits formed in the substrate of the record carrier and the track portions 9 are recessed portions in the substrate. In that case the entire surface area of the record carrier body may be covered with a layer of a highly reflecting material whose reflection can be influenced by the read beam.

Figure 2:
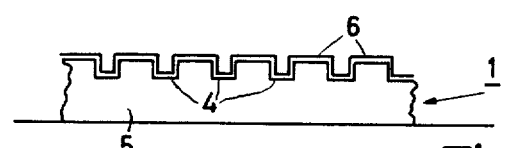

FIG. 2 shows a small part of a cross-section of a preferred embodiment of a record carrier body, taken on the line 2—2' in FIG. 1. The radially adjoining portions of the servo track are designated 4. The direction of the servo track is consequently perpendicular to the plane of drawing. The information layer 6 is disposed on the substrate 5, which for example consists of a plastic.

FIG. 3 shows a cross-section of a preferred embodiment of a record carrier body taken on the line 3—3' in FIG. 1. Each sector address 8 may comprise an address portion 8a and a synchronizing portion 8b. The address portion 8a comprises a plurality of pits 10 of uniform dimensions formed in the substrate. The pits represent the coded and modulated digital address information. The synchronizing portions 8b comprise constant sequence of pits 10 which during reading at a constant speed produce a constant clock signal with which the clock frequency of the signal source can be corrected. Each sector address 8 is followed by a track portion 9 which is recessed in the substrate, in which most of the information is written.

In the write apparatus the radiation coming from the record carrier body is directed towards a radiation-sensitive detection system. A pit of a sector address can be detected in that if the radiation beam is incident on a pit the detection system receives a different radiation intensity than if the radiation beam is incident between two pits on the record carrier body. Furthermore, if the radiation spot is projected on a track portion 9, the detection system will receive a different radiation intensity than if the radiation spot is projected beside the track portion 9. Thus, while the track portions 9 or the pits 10 are being followed, it is possible to detect whether the center of the radiation spot coincides with the middle of the servo track 4. Furthermore, the speed of the radiation spot relative to the servo track can also be determined from the speed with which an address portion 8a is read. It is evident that the areas 10 may alternatively comprise hills or projections and that the track portions 9 may project from the rest of the information layer.

The layer 6 may consist of a thin metallic layer, for example tellurium. By means of laser radiation of sufficiently high intensity the metallic layer in the track portions 9 can be melted locally, so that the information is locally given a different reflection coefficient. A record carrier is then obtained in which the servo and address information is contained in a phase structure and the information recorded by the user in am amplitude structure.

The layer 6 may also take the form of a double layer of materials which chemically react under the influence of incident radiation, for example aluminium on iron. At the location where a high-power radiation beam hits the layer FeAl$_6$ is formed, which is a poor reflector. A similar effect occurs in the case of a double layer of bismuth on tellurium, in which case Bi$_2$Te$_3$ is formed. The layer 6 may also consist of an anti-reflection layer. The laser radiation can then locally form reflecting areas.

For the sake of simplicity only a few revolutions of the servo track are shown in FIG. 1. In reality this servo track will, for example, cover 45,000 revolutions over an area with an inner radius of 7 cm and an outer radius of 14 cm. The period of the track structure in the radial direction is for example 1.6 μm and the track width for example 0.5 μm. The length of the areas 10 in the sector addresses 8 is for example 0.5 μm, which may also be the average length of the information areas which are written in the track portions 9. The length of the sector addresses is for example 1/10 of the length of the track portions 9. In such a track portion it is then possible to store, for example, the information of two lines of one document of standard A-4 format. The 45,000 revolutions of the track can then store approximately 380,000 A-4 documents of 30 lines each.

The size of the radiation spot is of the order of magnitude of the width of the servo track. Upon exposure of the servo track diffraction effects occur and the radiation beam is split into a zero-order subbeam, first-order subbeams and a number of high-order subbeams. A servo track having a phase structure has a specific phase depth. This is to be understood to mean the phase difference between the zero-order and the first-order subbeams.

The position of the radiation spot relative to the middle of the servo track can be detected with the aid of two radiation-sensitive detectors which are disposed in a plane in which the cross-section of the zero-order subbeams and those of the first-order subbeams partly overlap. The detectors are then situated on both sides of a line which is effectively parallel to the track direction. Such a tracking method, for reading a record carrier in which a television program is stored, is described in the article "Optical read-out of a video disc" in "I.E.E.E. transactions on consumer electronics", November 1976, page 307. This method may be used for following phase tracks with a certain phase depth.

The servo track may be a periodically undulating track.

FIG. 4 shows a plan view of a part of a record carrier body 1, with an undulating servo track 4 and FIG. 5 a plan view of a track portion 7 of the servo track 4. As will be explained hereinafter, the magnitude and the direction of a deviation in the position of the radiation spot relative to the average position of the center line 11 of the servo track can be determined with only one radiation sensitive detector when an undulating servo track is used. The detector is also used for reading the sector addresses or for reading the information recorded by the user.

The spatial frequency (1/p) of the undulation is substantially lower than the spatial frequencies of the areas in the sector addresses 8, so that the modulation in the detector signal as a result of the undulation of the servo track can be discriminated in respect of frequency from the modulation as a result of the areas in the sector addresses. In FIG. 5 the period of the undulation is equal to the length of one sector address 8. The period of the undulation may also be shorter than one sector address, provided that there is always an integral number of periods per sector address and per track portion 9. In FIG. 5 each track portion 9 corresponds to 9 undulation periods.

The amplitude (a) of the undulation of the servo track is so much smaller than the width of this track, that a sufficiently large part of the radiation spot is always incident on the servo track. The amplitude is for example 1/10 of the track width.

When an undulating servo track is used the phae of the undulation should be well-defined. In the record carrier body in accordance with the invention this is ensured in that this phase is locked to the beginning of each sector address. For example at the beginning of each sector address the lateral excusion of the servo track is zero, as is indicated in FIG. 5.

In a different embodiment of a record carrier body in accordance with the invention the servo track portions between the sector addresses are not continuous track portions, but these servo track portions are constituted by a number of tracking areas 12, such as long pits, of uniform dimensions which are spaced at a comparatively large distance from each other, as is shown in FIG. 6a. This Figure shows a part of a number of adjacent servo track portions in plan view.

The sector addresses are again designated 8 and the associated track portions 9. Between the areas 12 a certain amount of information, for example a word, can be written. During recording of the information the areas 12 are used for correcting the position of the radiation spot relative to the middle of the servo track.

The areas 12 may also comprise short areas of constant length, which are spaced at a constant distance from each other. In FIG. 6b, which shows a part of the servo track in accordance with FIG. 6a on an enlarged scale, these areas, also referred to as synchronizing areas, are designated 13. The synchronizing areas are for example pits. During read-out with constant speed the synchronizing areas produce a constant clock signal. Thus, the clock frequency of the signal source can be corrected during information recording also in the time interval in which the radiation spot travels from one sector address to a subsequent sector address. The use of tracking areas which are divided into synchronizing areas is particularly effective when the distance between two consecutive sector addresses is great.

Thus, a record carrier body in accordance with the invention contains an amount of servo information which is used when said record carrier body is written in. As a result of this, the write equipment located at the individual users need not comply with stringent requirements in respect of the mechanical drive of the optical write-read head and of the record carrier body and in respect of the vibration-free suspension of the various optical elements of the optical system. Instead, the apparatus with which a servo track with sector addresses is written in the record carrier body should now comply with these stringent requirements.

In U.S. Pat. No. 4,057,831 a method is described for optically writing a television program in a carrier body which is provided with a photoresist layer. The intensities of a laser beam are then switched between a high level and a low level, the switching instants being determined by the information to be written. The photoresist layer which moves relative to the laser beam is thus exposed intermittently in accordance with the information to be written. A similar method may be used for writing a servo track in a record carrier body in accordance with the invention. Only during writing of the sector addresses is the intensity of the write beam switched between a high level and a low level in accordance with the address to be written. In the time interval between the writing of two consecutive sector addresses the write beam always has the high intensity level. The exposed pattern thus obtained can be converted into a depth profile with the aid of known developing and etching techniques, which profile for example comprises recessed continuous track portions which alternate with sector addresses also consisting of recessed areas of uniform dimensions. From a so-called master disc thus obtained a large number of pressings of for example a plastic can be manufactured, using pressing techniques similar to those used in the manufacture of audio records. After a layer of a material which can be influenced by the write radiation has been deposited on said discs, they can be provided with the desired information by the user. Then, only one expensive write apparatus is required to provide a large number of users with record carrier bodies containing a servo track.

When manufacturing a record carrier body with an undulating servo track the direction of the radiation beam is periodically varied through small angles during writing of said servo track in a manner as described in U.S. Pat. No. 4,223,347. For this purpose a direction modulator, for example an acousto-optical modulator, is included in the path of the radiation beam. Such a modulator consists of a cell with a certain medium such as water or glass, on which cell electromechanical transducers are mounted. When a signal is applied across these transducers audio waves are produced in the cell. This gives rise to so-called Bragg diffractions in the cell medium, so that a radiation beam which passes through the cell is diffracted. The diffraction angle is determined by the frequency of the electrical signal applied across the electro-mechanical transducers. By periodically and continuously varying this frequency it is achieved that the recorded servo track is an undulating track.

When a servo track with continuous tracking areas in accordance with FIG. 6a is written, relatively long control pulses are applied to the intensity modulator for the write beam in the time interval between the writin of two sector addresses, which pulses have a comparatively low repetition frequency and which switch the intensity of the beam to the high (write) level. If each of these control pulses i divided into a plurality of short control pulses a servo track in accordance with FIG. 6b is obtained.

FIG. 7 schematically shows a first embodiment of an apparatus in accordance with the invention. A round disc-shaped record carrier body is designated 1. The body is provided with a spiral servo track 4 of which only a few revolutions are partly shown. The record carrier body is rotated with the aid of a spindle 21 which is driven by a rotary motor 22. The radiation beam 24, which is produced by a gas laser 23, for example a helium-neon laser, is reflected to the record carrier body by the mirror 28 and is focussed to a radiation spot V on the radiation-sensitive layer 6 of the record carrier body by an objective 29. The optical auxiliary system comprising the lenses 26 and 27 ensures that the objective 29 is correctly filled, so that the radiation spot V has minimal dimensions.

The mirror 28 is a tilting mirror which is journalled on for example a diamond fulcrum 37 in such a way that it can be tilted about an axis perpendicular to the plane of drawing and, as the case may be, about an axis parallel to the record carrier body and perpendicular to the first axis. The tilting movement about the first-mentioned axis, which is obtained by means of the electromagnetic coil 38, enables the position of the radiation spot V in the radial direction to be corrected, while the tilting movement about the second axis, which is achieved with the aid of the electromagnetic coil 39, enables the tangential speed (the speed in the longitudinal direction of the track) to be corrected. For the correction of the focussing of the objective relative to the radiation-sensitive layer 6 the objective 29 can for example be suspended in a moving coil 44, so that the objective can be moved in the direction of the arrow 45, i.e. along its optical axis.

The objective 29 and the tilting mirror 28 are accommodated in a carriage 46. This carriage can be moved in the direction of the arrow 49 by the lead screw 47, which is driven by the carriage motor 48. Thus, in addition to fine control by means of the tilting mirror 28, coarse control of the radial position of the radiation spot V is possible.

The control signals for correcting the radial position and, as the case may be, the tangential speed of the radiation spot and the focussing of the radiation beam, are supplied by an electronic circuit arrangement (the outputs e, g and f), which is schematically represented by the block 55 in FIG. 7. This arrangement, whose components may take the form of an integrated circuit (I.C.), will be discussed in more detail with reference to FIG. 8.

The radiation which is reflected by the layer 6 of the record carrier body is reflected by a beam splitter, for example a semi-transparent mirror 30 and, as the case may be, a second mirror 57 to a radiation-sensitive detector 32. The lens 31 ensures that the radiation is concentrated on the detector as far as possible. The output signal of the detector 32 is applied to the input 1 of the arrangement 55. As will be explained hereinafter, this output signal is used for deriving a radial and, as the case may be, a tangential control signal, both during writing and during reading. During writing the signal from the detector 32 is moreover used for reading the addresses and, as the case may be, the synchronizing areas and for checking whether the applied information is actually written. During reading of a record carrier, which has been provided with information by the user, the detector 32 supplies the address information and the useful information.

The path of the radiation beam 24 includes an intensity modulator 25, with which the intensity of the radiation beam can be switched between a first (high or write) level and a second (low or read) level. This modulator is controlled by means of the circuit 55 (output h). The modulator 25 may be an electro-optical modulator and comprise an assembly of an electro-optical crystal which, depending on the voltage applied, rotates the plane of polarization of the radiation beam, and an analyser, which converts the variation in polarization into an intensity variation of the radiation beam.

However, the modulator 25 is preferably an acousto-optical modulator comprising an acousto-optical cell and an aperture which for example only transmits the zero-order beam. If no acoustic wave passes through the cell, no radiation is diffracted, so that all radiation is transmitted to the record carrier body by the aperture. The intensity on the layer 6 of the record carrier body is then sufficiently high to melt said layer locally. If an acoustic wave travels through the cell, most part of the radiation is diffracted and for example only 20% of the radiation emitted by the source is contained in the transmitted zero-order beam. The intensity of the radiation beam which is incident on the layer 6 is then too low to produce a change in said layer, but it is sufficiently high to read the information already recorded.

The information to be recorded is stored in a memory 56, for example a Random Access Memory (RAM), which is connected to the input d of the arrangement 55. This arrangement is shown in more detail in FIG. 8, though still in block-schematic form.

In this FIG. 60 is an information register in which a certain block of information to be recorded is stored temporarily. The address, in which this block of information is to be written, is then stored in an address register 61. The information register 60 is connected to a control circuit 62. This circuit comprises a number of electronic components with the aid of which the applied information is modulated and coded. The method of coding and modulation falls beyond the scope of the present invention. For a better understanding of the apparatus in accordance with the invention, a possible method of processing the applied information will be described in general and merely by way of example.

The flow of digital zeros and ones (also referred to as bits) are each time divided into a fixed number of, for example 13 bits, so that a number of bit rows are obtained. To each row a number of for example 3 bits is added, the so-called parity bits, so that one row always contains a fixed number of zeros and ones. Thus, a certain error correction is built in.

First of all the first bits of all bit rows thus obtained are read and transferred, subsequently the second bits of all rows etc., up to and including the last bits of all rows. This process is called interleaving. It ensures that in the event of errors during writing, which errors are generally a few bits long, only one error bit per row occurs, assuming of course that the errors are not too long. Errors thus distributed can be corrected by means of the built-in parity check during reading of the record carrier.

Finally coding is effected in such a way that the number of zeros and the number of ones is balanced. For example, every two consecutive bits are converted into four bits, the combinations 00, 11, 01 and 10 being converted into 0011, 1100, 0110, 1001 respectively, as described in "Nachrichtentechnische Zeitschrift" 1970, No. 1, page 11–16, FIG. 7 under 2.

The information thus encoded is applied to the modulator 25.

The address bits already present on the record carrier body may have been modulated and encoded in the same way as described hereinbefore for the information bits to be written.

Before a block of information can be recorded the correct address should be located. For this purpose the radiation beam 24 is switched to read level. As soon as a specific sector address passes underneath the radiation spot V, the radiation which is reflected by the record carrier body, and thus the output signal of the detector 32, is modulated at high frequency in accordance with the sequence of the bits of the instantaneously read address. The signal from the detector 32 is applied to a circuit 63. In this circuit the signal is decoded and demodulated, the signal being converted into address information during reading of an address. The circuit 63 may thus be regarded as the inverse of the circuit 62. The bits of the instantaneously read address are stored in an address register 64. In a comparator 65 the addresses contained in the registers 61 and 64 are compared. When these addresses are the same the comparator supplies a signal to the information register 60, so that said register transfers the stored information to the circuit 62.

The modulator 25 then switched in accordance with the sequence of the bits of the block of information to be written, so that the radiation produced by the laser 23 is divided into radiation pulses of high (write) intensity and radiation pulses of low (read) intensity.

When locating the correct address the comparator 65 can also ascertain whether the spot V is already close to the desired address or is still remote from said address. In the last-mentioned case the comparator can supply an additional control signal to the controller 68 for the carriage motor 48, so that the radiation spot V is moved in the radial direction with a speed which is substantially higher than the speed with which the radiation spot is moved in the radial direction when all adjacent track portions are scanned sequentially. As soon as the radiation spot has approached the desired address closely enough, the additional control signal ceases.

During reading of the addresses and writing the blocks of information the center of the radiation spot should be positioned on the center line of the servo track. A deviation in the radial position of the radiation spot, as previously stated, can be detected if instead of one detector 32 two subdetectors are used. These detectors are then disposed in the plane in which the first-order beams, which have been diffracted in the radial direction by the servo track, partly overlap in zero-order beam. The subdetectors are then disposed on both sides of a line which is effectively parallel to the track direction in such a way that the first subdetector is situated in the area of overlap of the +1 order beam with the zero-order beam and the second subdetector in the area of overlap of the −1 order beam with the zero-order beam. The difference between the output signals of the subdetectors depends on the magnitude and the direction of a deviation from the radial position of the radiation spot. The signal which is obtained by adding the signals from the subdetectors is the same as the signal supplied by the single detector 32 in FIG. 7 and during reading of the addresses the address information can be derived therefrom again.

The position in the radial direction of the radiation spot relative to the center line of the servo track can also be determined with a single detector 32, if the servo track is an undulating track as shown in FIG. 7. For the description of the servo control for the radial position of the radiation spot it is assumed that the servo track is an undulating track.

When the radiation spot V travels along such a track the radiation which is reflected by the record carrier body, and thus the output signal of the detector 32, is modulated additionally.

If the radiation spot exactly follows the center line of the serve track the time frequency of the additional modulation is twice as high as the time frequency which corresponds to the spatial frequency of the undulation of the servo track. If the center of the radiation spot deviates from the center line of the servo track, the time frequency of the additional modulation is equal to the time frequency corresponding to the spatial frequency of the undulation. By detecting whether the signal from the detector 32 contains a periodic component of a specific frequency, it is thus possible to ascertain whether there is a deviation between the center of the radiation spot V and the center line of the servo track 4.

As is indicated in FIG. 8, the signal from the detector 32 is therefore applied to a low-pass filter 66, which filter for example transmits only frequencies lower than 60 kHz, assuming that the time frequency of the servo-track undulation is 30 kHz. In order to determine the direction of a radial deviation of the radiation spot relative to the servo track, the phase of the output signal of the filter 66 should be compared with a reference phase. For this purpose the phase of the servo track undulation is related to the beginning of a sector address; for example, as is shown in FIG. 5, the lateral excursion of the servo track at the beginning of a sector address is zero. The output signal of the filter 66 is applied to a phase comparator 67 in which its phase is compared with the reference phase from the circuit 63. When the phase is the same, the center of the radiation spot will for example slightly be offset relative to the center line of the servo track, namely towards the center of the record carrier body, while in the case of a small displacement of the center of the radiation spot relative to the center line of the servo track towards the outside of the record carrier body there will be phase difference of 180° between the output signal of the filter 66 and the reference signal from the circuit 63.

The radial error signal $S_r$ thus obtained is applied to a controller 68. The control signal supplied by the controller is applied to the coil 38 of the tilting mirror 28 (compare FIG. 7), so that this mirror is tilted in such a way that the amplitude of the component of undulation frequency in the signal from the detector 32 is zero. The center of the radiation spot is then situated exactly on the center line of the servo track.

The controller 68 is further connected to the motor control 50 for the carriage motor 48. This motor can drive the carriage 46 with a uniform speed in such a way that as the record carrier body rotates all revolutions of the track are scanned completely. The tilting mirror is then used for correcting minor inaccuracies in the radial position of the radiation spot. The tilting mirror may also be used for moving the radiation spot from one revolution to another revolution of the track. The area on the record carrier body which can be scanned by moving the tilting mirror is limited. It is alternatively possible that the carriage motor 48 is controlled in response to the deviation of the tilting mirror 28 relative to its central position, in order to keep within the field of view of the objective 29.

The servo-track undulation may also be used for reading a record carrier which has been recorded on by the user, in order to keep the radiation spot correctly positioned relative to the information track.

The tangential speed of the radiation spot relative to the track, i.e. the speed in the track direction should be maintained constant when the information bits are applied with a constant frequency. For this purpose the speed of the motor 22 or the speed of rotation of the record carrier body can be compared with a fixed reference signal and thus be corrected in a manner known per se.

Under certain conditions this control may not be accurate enough. This is because there may be eccentricities, so that even at a constant speed of rotation the various track portions of the record carrier body are not scanned with the same speed. For a more accurate control of the tangential speed of the write spot use can be made of the address areas or synchronizing areas in the sector addresses.

The tangential speed of the radiation spot is given by the speed with which said bits are read. This read speed can be derived from the circuit 63. The information register 60 is connected to an electronic clock 70, which clock determines the rate at which the bits contained in the information register are transferred to the circuit 62. In the frequency or phase comparator circuit 69 the frequency or phase of the signal from circuit 63 is compared with the frequency or phase of the signal from the clock 70. The resulting signal $S_t$ is used for adapting the clock signal and the tangential speed of the radiation spot to each other.

Preferably, the clock frequency is corrected with the signal $S_t$ as is indicated by the line 76 in FIG. 8.

However, the signal $S_t$ may also be used for correcting the speed of the radiation spot in the track direction, as is indicated by the dashed lines in FIG. 8. For this purpose the signal $S_t$ is applied to a tangential controller 71, whose output is connected to the coil 39 for the tilting mirror 28, so that the speed of the radiation spot in the longitudinal direction of the track is corrected in such a way that the signal $S_t$ becomes zero.

When writing in a record carrier body in accordance with FIG. 6b it is also possible to derive a signal $S_t$ for tangential-speed correction from the synchronizing areas of the tracking areas 12.

In order to generate a focussing error signal, which provides an indication of a deviation between the plane of focussing of the objective and the plane of the servo track of the plane of the information track respectively, both during recording on a record carrier body and during reading of a record carrier, the apparatus may be provided with a second radiation-sensitive detector 34 which is disposed behind a semitransparent mirror 57. The detector 34 comprises four subdetectors whose output signals are applied to the electronic circuit arrangement 55. For simplicity FIG. 7 shows only one signal line from the detector 34 to the multiple input C ($C_1$, $C_2$, $C_3$, $C_4$ in FIGS. 8 and 9). Between the semitransparent mirror 57 and the detector 34 an optical wedge 33 is interposed. As is shown in FIG. 9 this wedge splits the radiation beam 24' into two subbeams 24'a and 24'b, which cooperate with the subdetectors 34a, 34b and 34c, 34d respectively.

FIGS. 7 and 9 represent the situation in which the beam 24 is focussed exactly on the plane of the servo track or the information track. The focus F of the reflected beam is then situated exactly on the apex of the wedge 33, and the subbeams 24'a and 24'b are symmetrically incident on the detectors 34a, 34b and 34c, 34d respectively. If the focus of the radiation beam 24 were situated above the plane of the track in FIG. 7, the focus F in FIG. 9 would be situated to the left of the apex of the wedge 33. The subbeams 24'a and 24'b would then have moved inwards, i.e. the detector 34b and 34c would receive more radiation then the detector 34a and 34d respectively. If, in FIG. 7 the focus of the beam 24 were situated underneath the plane of the track, the focus F in FIG. 9 would be situated to the right of the apex of the wedge and detector 34a and 34d would receive more radiation than the detector 34b and 34c respectively.

The outputs of the detectors 34a, 34b, 34c and 34d are connected to the inputs $C_1$, $C_2$, $C_3$ and $C_4$ of the arrangement 55. This arrangement comprises a summing device 80, in which the signals from the detectors 34a and 34d are added to each other, and a summing device 81, in which the signals from the detectors 34b and 34c are added to each other. The outputs of the summing devices 80 and 81 are connected to a differential amplifier 82, at whose output the focussing error signals $S_{FF}$ appears. This signal is applied to a focussing controller 83, which controls the current through the coil 44 of the objective 29 (see FIG. 7), and thus the position of the objective relative to the plane of the track.

An advantage of the focussing error detection system in accordance with FIG. 9 is that the influence on the focussing error signal $S_{FF}$ of a shift, transverse to the direction of the beam 24', of the composite detector 34 relative to the wedge 33 or other elements of the optical path can be eliminated. If the wedge is shifted relative to the composite detector 34, the subbeams 24'a and 24'b are shifted in the same direction over the associated detectors 34a and 34b and the detectors 34c and 34d. If the wedge were shifted upwards, the subbeams 24'a and 24'b would both move upwards relative to the composite detector 34, so that the detectors 34a and 34c would receive more radiation than the detectors 34b and 34d.

Should the wedge be moved downwards relative to the composite detector 34, the subbeams would also be moved downwards and the detectors 34a and 34c would receive less radiation than the detectors 34b and 34d. As is indicated in FIG. 8, the signals from the detectors 34a and 34c are added in the summing device 84 and the signals from the detectors 34b and 34d in the summing device 85. The outputs of these summing devices are connected to a differential amplifier 86 at whose output (K) a positional error signal $S_{PF}$ appears. The signal enables for example the position, transverse to the beam direction, of the wedge 33 relative to the detector 34 to be corrected.

Instead of by means of a wedge and a composite detector 34 comprising four subdetectors, a focussing error signal can also be derived by means of two detectors at the location of the detectors 34b and 34c and a knife-edged radiation-absorber, whose knife edge is situated at the location of the apex of the wedge in FIG. 9. This knife edge absorber blocks half the radiation beam 24' and ensures that in the case of a focussing error of the radiation beam 24 one of the detectors receives more radiation than the other. The difference signal of the two detectors then provides an indication of the magnitude and the direction of a deviation between the focus of the radiation beam 24 and the plane of the track.

The apparatus in accordance with FIGS. 7 and 8 provides the important feature of checking during writing whether the desired information is actually being written, without the use of an additional radiation spot. As a result of for example material flaws in the layer 6, it may happen that at a location in the layer 6 where the read spot has the write intensity no optically detectable change occurs, i.e. no information area is written. For checking the write process use is made of the radiation which is reflected by the layer 6, which radiation is intercepted by the detector 32. The intensity of this radiation is then determined immediately after switching from write intensity to read intensity. At that instant the radiation spot V is still partly located above the area in which an information bit should have been recorded. An information area is for example formed in 50 nanosecs., while the radiation spot in for example on an averave 1 μsec. covers the distance between the center of an information area and the center of the next information area. If the information bit has actually been recorded, the radiation at the detector 32 will have a different intensity than if the bit has not been written, because the reflection coefficient of the layer 6 changes locally as a result of writing.

In the circuit 63 the signal from the detector 32 is modulated and decoded. The output of this circuit is connected to an information register 74. Before the signal from the detector 32 is applied to the circuit 63 it is passed through a circuit 73, a so-called normalizing circuit. A signal which provides an indication about the intensity of the laser beam emerging from the modulator 25 is applied to the input b of said circuit. The last-mentioned signal can be obtained with the aid of an additional detector 36 which receives the radiation which is reflected by the semitransparent mirror 30, as the case may be via an auxiliary lens 35 (compare FIG. 7).

In the circuit 73 for example the level of the signal at input b is determined, and on the basis of this the signal from the detector 32 is transferred to the circuit 63 only when the laser beam emerging from the modulator 25 has the read intensity.

In the circuit 73 the signal from the detector 32 can also be normalized with the signal at the input b in a different manner. The first-mentioned signal may for example be divided by the last-mentioned signal.

After the last bit of the information block stored in the information register 60 has been applied to the modulator 25, the contents of the registers 60 and 74 are compared with each other in the comparator 75. When the contents are equal, the comparator 75 can give a command to the register 60, so that a subsequent information block is read into said register. If the contents of the registers 60 and 74 do not correspond, in other words if during writing an error has occurred which is not corrected by the encoding and modulating system which is used, the register 60 receives the command that the relevant block is to be rewritten. Moreover, via the output L of the circuit arrangement 55, the memory 56 is informed that the relevant block of information has been written in an other than the original sector address.

It is to be noted that by means of the method described it is also possible to check whether as a result of material flaws no areas are formed which are not information areas but which may be interpreted as such during reading.

During reading of an information carrier which has been written in by the user, a decoded and modulated information signal is produced at the output m of the circuit arrangement 55. This signal is suitable for reproduction by for example a monitor 58 (compare FIG. 7).

FIG. 10 shows a second embodiment of an apparatus in accordance with the invention, in which apparatus a semiconductor laser (or diode laser) 90 is used as radiation source. The use of a diode laser for reading an information structure has been described in U.S. Pat. No. 3,941,945. The Applicant has succeeded in manufacturing an AlGaAs diode laser, which produces sufficient energy to write information in a layer of a suitable material, such as tellurium or bismuth.

The diode laser 90 is provided with two electrodes 91 via which an electric current supplied by the current source 101 is injected into the diode laser. The intensity of the radiation which is emitted by the diode laser is a function of the electric current injected into the laser. FIG. 11 represents the variation of the radiation intensity I as a function of the electric current C. Up to a specific current $C_1$ the diode laser behaves as a radiation emitting diode and no laser action occurs. The laser action starts at a current intensity above the level $C_1$. The control circuit 62 in FIG. 10 adjusts the current to the level $C_2$ or $C_3$ respectively, so that the intensity of the laser radiation is set to the read level $I_2$ and the write level $I_3$ respectively. The radiation from the diode laser is received by the objective 93. Depending on the type of laser which is used there may be provided a cylindrical telescope comprising the lenses 94 and 95. The laser beam 24 is again passed to the record carrier body 1 via the same optical elements as in FIG. 7. The radiation reflected by the record carrier body is again passed to the detector 32.

In order to check during writing whether the bits have actually been written, an additional detector 36 is provided again. However, this detector may now be disposed behind the diode laser 90. Use is then made of the fact that a diode laser emits a radiation intensity from its back which is proportional to the radiation intensity emitted at the front.

Apart from in the manner as described with reference to FIGS. 7 and 8, a focussing error signal may also be derived by moving the diode laser to and fro along the optical axis of the read system, i.e. in the direction of the arrow 97 at a fixed frequency. This periodic movement of the diode laser can be obtained with the aid of a magnet coil to which a periodically varying current is applied. However, preferably, piezoelectric drive means are employed for this movement. As is shown in FIG. 10, the diode laser is mounted on a rod 92. This rod is secured to a piezo-plate 96, which plate is rigidly connected to a mounting plate 103 which forms part of a frame on which the other elements of the apparatus, except for the mirror 28 and the objective 29, are mounted. The control circuit 98 supplies a periodically varying voltage of a fixed frequency to the piezo plates 96, so that the diode laser is given a periodic movement.

As a result of this movement the radiation beam is periodically focussed and defocussed on the layer 6 of the record carrier body, so that a period component is impressed on the signal from the detector 32. If on the average, i.e. apart from the periodic movement, the radiation beam is correctly focussed on the plane 6, the frequency of the periodic component in the signal from detector 32 equals twice the frequency with which the diode laser is moved. However, if the radiation beam is not correctly focussed on the average, the frequency of the periodic component is equal to the frequency with which the diode laser is moved. The phase of the periodic component is for example equal to the phase of the control signal from the circuit 98 if on the average the radiation beam is focussed too high. If on the average the radiation beam is focussed too low, the periodic component is 180° phase shifted relative to the signal from the control circuit 98. The magnitude and the direction of an average focussing error can be derived from the frequency and the phase of the period component in the signal from the detector 32.

For this purpose, as is shown in FIG. 10, the signal from the detector 32 is applied to a low-pass filter 100, which only transmits frequencies lower than twice the frequency of the control signal from the control circuit 98. In the phase comparator 99 the phase of the signal from the filter 100 is compared with the phase of the signal from the control circuit 98. The output signal of the phase comparator is applied to for example the controller 83 for correcting the position of the objective 29.

The frequency with which the diode laser is moved is of the order of a hundred times smaller than the frequency with which the areas of the sector addresses and the information areas are read and written. The amplitude of the diode-laser movement has been selected so that the layer 6 always remains within the depth of focus of the objective. This amplitude is for example of the order of some tenths of 1 μu.

In the apparatus of FIG. 10 a signal for correcting the tangential position of the radiation spot can be derived in the same manner as described for the apparatus in accordance with FIGS. 7 and 8.

A signal for correcting the position of the centre of the radiation spot relative to the centre line of the track can also be obtained in the manner as described for the apparatus in accordance with FIGS. 7 and 8. Thus, with the aid of two detectors disposed in the areas of overlap of the first-order beams with the zero-order beam, or with the aid of an undulating servo track. As is inter alia known from U.S. Pat. No. 3,941,945, a feedback effect may occur when a diode laser is used in a read apparatus, i.e. the radiation which is reflected by the information carrier to the diode laser may give rise to further radiation emission under certain conditions. The intensity versus current characteristic will then vary in accordance with the dashed line 105 instead of in accordance with an uninterrupted line 104 as shown in FIG. 11. In the case of feedback the radiation intensity ($I_4$) emitted by the diode laser at a specific current $C_2$ is higher than the radiation intensity ($I_2$) which is emitted by the diode laser at the same current if no feedback occurs.

The feedback effect may be employed to have the diode laser itself operate as a radiation-sensitive detector. The intensity of the radiation reflected to the diode laser depends on the condition of the layer 6 at the location of the radiation spot V. It will be evident that, if the radiation beam is incident on an address bit or an information bit, the radiation intensity received by the diode laser will be different than if the radiation spot is incident on an intermediate area between two information bits or between two address bits The difference in radiation intensity obviously depends on whether the servo track and the information areas have a phase structure or an amplitude structure, the phase depth being of importance in the case of a phase structure.

An embodiment of an apparatus which utilizes the feedback effect is shown in FIG. 12.

The laser beam 24 produced by the diode laser 91 is reflected to the objective 29 by the mirror 105 and is focussed to a radiation spot V on the information layer of the record carrier body by the objective. The astigmatism of the laser beam 24 is corrected by means of a cylindrical lens 104. The beam reflected by the record carrier body is reflected to the diode laser by the mirror 105. The intensity of the radiation emitted by the diode laser 90 and thus of the radiation received by the detector is then determined by the condition of the information layer at the location of the radiation spot V.

The servo signals for correcting the radial position and the tangential speed of the radiation spot V relative to the track can again be derived in manners as described with reference to FIGS. 7 and 8.

For determining a focussing error there are provided again four detectors $34a$, $34b$, $34c$ and $34d$ and an optical wedge 33; as shown in FIG. 7. The mirror 105 is then not fully reflecting, but transmits a part of the radiation coming from the record carrier body. The transmitted radiation beam is split into two subbeams $24a'$ and $24b'$ by the wedge 33. These beams are reflected by the mirror 106 and are focussed to radiation spots on the detectors $34a$, $34b$ and the detectors $34c$, $34d$ respectively by the lens 107. The output signals of the four detectors are processed in the manner as described with reference to FIG. 8. In order to have an indication about the level, write or read level, to which the diode laser has been set during checking of the recorded information areas, the current supplied by the current source 106 can be measured, for example by measuring the voltage across a resistor R through which the diode current flows.

It is to be noted that the apparatus in accordance with FIG. 10 does not utilize the feedback effect.

Owing to the feedback effect the electrical resistance of the diode laser will also vary depending on the condition of the layer 6 at the location of the radiation spot V. This property may be used for writing-in a record carrier body and for reading a record carrier with an apparatus which, apart from the diode laser, does not include any radiation-sensitive detector. The principle of such an apparatus is shown in FIG. 13. The voltage across the diode laser, which voltage is taken off via a coupling capacitor, normalized with the current through the diode laser, provides an indication about the condition of the information layer at the location of the radiation spot. The current through the diode laser is for example represented by the voltage across the resistor R. The coil in series with the current source constitutes a high impedance for the signal across the diode laser.

A preferred embodiment of a record carrier written-in in accordance with the described method and the described apparatus comprises a spiral-shaped servo track or a servo track comprising a multitude of concentric subtracks formed in the reflecting information layer, which servo-track has a phase structure. Per revolution a large number of sector addresses are provided, which also have a phase structure. Between the sector addresses the information is recorded in the form of an amplitude structure. When the record carrier is read the servo structure may be employed for following the information track.

During writing of information the radial servo control insures that the radiation spot follows a non-undulating track, so that generally the information areas will be arranged in accordance with a straight track. When writing in a record carrier body with an undulating servo track, it may happen that most of the write radiation energy is incident at the undulating servo track, so that the information areas are arranged in accordance with a track which substantially coincides with the undulating servo track.

In the apparatus described above one radiation spot is employed. The information transfer rate Tr which is attainable is limited by the frequency with which the laser intensity can be switched, in the case of a diode laser the frequency with which the current through the diode laser can be switched. In addition, the maximum information transfer rate is limited by the speed with which the record carrier body can be rotated and the maximum spatial frequency of the areas in the track. Of particular importance is the product of the maximum spatial frequency (fm) and the minimum track speed which occurs at a specific rotation speed of the record carrier body. The maximum spatial frequency is the spatial frequency of those areas which can still be read individually with the optical system which is used. The minimum track speed for a round record carrier is the speed of the inner track of the radius $r_o$. This speed is given by: $2\omega_o \times r_o$, where $\omega_o$ is the number of revolutions per second of the record carrier. Apart from the maximum frequency with which the laser intensity can be switched, the following equation is then valid for the information transfer rate $T_r$: $T_r = \pi \times \omega_o \times r_o \times f_m$.

In an embodiment of a record carrier $f_m$ was of the order of 1.5 periods/$\mu$, $\omega_o$ was 25 revolutions/sec., $r_o$ was 7 mm. Hence, $T_r$ was of the order of 30 MHz.

The information transfer rate can be increased by writing and reading with a plurality of radiation spots, whose intensities can be controlled and detected individually. Use can then be made of a number of diode lasers. The diode lasers may be separate adjacently arranged elements. However, they may also be integrated to form one unit. In FIG. 14 a composite diode laser 90 is shown, which by way of example comprises four laser elements $90_1$ to $90_4$. The composite diode laser comprises a common layer 110 of n-type AlGaAs on which a common electrode 111 is arranged. The layers $112_1$ to $112_4$ of p-type AlGaAs are isolated from each other. On these layers the individual electrodes $113_1$ to $113_4$ are arranged. The isolated regions $114_1$ to $114_4$ are the active GaAs regions in which the laser action for the various diode lasers $90_1$ to $90_4$ occurs. Each of these lasers is energized by a separate current source $101_1$ to $101_4$. The current sources are controlled by separate control circuit $62_1$ to $62_4$. In FIG. 14 the emerging laser beams are directed towards the reader.

As is indicated in FIG. 15, the laser beams $24_1$ to $24_8$ follow an optical path similar to that in FIG. 12. The element 116 is for example a cylindrical lens. In FIG. 15 the composite diode laser of FIG. 14 is shown in bottom view. The laser beams $24_1$ to $24_4$ are focussed to separate radiation spot $V_1$ to $V_4$ by the objective 29. As a result of the optical system which is used, the distance between the radiation spots $V_1$ to $V_4$ is smaller than the distance between the associated laser sources $90_1$ to $90_4$. The radiation spot $V_1$ is situated at the servo track 4, while the other radiation spots are situated at the desired mutual distance of for example 1.6 $\mu$m between two consecutive turns of the servo track 4. The laser beams $24_1$ to $24_4$ reflected by the layer 6 are returned to the associated diode lasers $90_1$ to $90_4$.

The radiation spot $V_1$ has the same function as the radiation spot V in FIG. 14. During writing this radiation spot is used for reading the sector addresses, for writing the information, for checking the recorded information areas, and for generating servo signals for correcting the radial and the tangential position of the radiation spot and the focussing of the laser beams. During reading of a record carrier on which information has been recorded by the user the radiation spot $V_1$ is used for reading the sector addresses and the information, and for generating the servo signals. The laser beam $24_1$ reflected by the layer 6 is processed in a similar way as indicated in FIG. 12 or FIG. 13. The laser beams $24_2$ to $24_4$ are used during writing for the actual write operation and for checking the recorded areas and during reading of a record carrier for information reading only. During writing and reading the intensities of the reflected laser beams $24_2$ to $24_4$ can be determined with the aid of a radiation-sensitive detector behind each of the diode lasers $90_2$ to $90_4$ (compare the detector 32 in FIG. 12). Said intensities can also be determined by measuring the variation in the electrical resistance across the individual diode lasers, as is indicated for the diode laser 90 in FIG. 13.

During writing with the aid of a plurality of radiation spots a record carrier body is used in which the consecutive revolutions of the servo track 4 are situated at a comparatively large distance, for example 6.8 $\mu$m, as is indicated in FIG. 16. The servo track 4 in its turn comprises sector addresses 8 and areas 9 in which information is to be written. After writing the areas between the consecutive revolutions of the track 4 are also provided with information areas in addition to the areas 9 of the servo track 4. The information areas between the revolutions of the servo track 4 are arranged in accordance with tracks 4' represented by dashed lines in FIG. 16. The tracks 4' are straight tracks, also if the servo track is an undulating track. The information tracks 4' preferably have an amplitude structure, while the servo track 4 has a phase structure, the areas 9 containing information in the form of an amplitude structure. During reading of the record carrier the servo track may then be employed for correcting the radial position of the radiation spot. The servo track 4 may then also be a straight track.

The invention has been described on the assumption that the information layer is reflecting. However, it is alternatively possible to employ the invention in the case of a radiation-transmitting information layer, provided that no use is made of the feedback effect in a diode laser.

If a radiation-transmitting information layer is to be written in, the detector 32 in the apparatus in accordance with FIGS. 7 and 10 should be included in the path of the radiation beam which passes through the record carrier body. A servo signal for the focussing can then no longer be derived in accordance with the method described with reference to FIGS. 7 and 8, which makes use of the fact that the information layer is reflecting. A focussing detection system may then be used which utilizes the servo information. For this purpose, for example two detectors may be arranged after each other in the tangential direction in the radiation beam coming from the record carrier body, as is described in patent application 410,775, filed Nov. 15, 1972, now abandoned, which has been laid open for public inspection. The phase difference of the output signals of the two detectors depends on the extent to which the radiation beam is focussed at the plane of the track.

What is claimed is:

1. A method of recording information on a record carrier body having a preformed, optically detectable, elongated servo track for guiding a beam of radiation, said servo track comprising a plurality of successive sections extending in the track direction, each section having a first portion containing a first plurality of preformed, optically detectable areas spaced from each other in the track direction, and an information portion adjoining said first portion and having thereon a radiation sensitive layer, said areas of said first plurality in said first portion of each section comprising address areas which define an address of said information portion of that section, and the information portion of a given section adjoining the first portion of an adjacent section, said method comprising the steps of focussing a beam of radiation to a single spot on said preformed servo track, producing relative movement between said spot and said record carrier body, switching the intensity of said radiation in said beam to a first level at which the intensity is not sufficient to produce an optically detectable change in said radiation sensitive layer, with said beam at said first level, reading with said spot the address defined by said address areas to detect the address of a desired information portion and simultaneously therewith checking whether said spot coincides with the center of said servo track by detecting the radiation of said beam coming from said record carrier body, thereafter switching the intensity of the radiation of said beam to a second level at which the intensity is sufficient to produce an optically detectable change in said radiation sensitive layer, with said beam at said second level writing a block of information with said spot in said desired information portion associated with the address thereof read during said reading step, and during writing of said information checking whether said spot coincides with the average position of the center line of said servo track by detecting radiation of said beam coming from said record carrier.

2. The method according to claim 1 wherein said areas of said first plurality in said first portions include optically detectable synchronizing areas which are uniformly spaced from each other and wherein during said reading step, the speed of said relative movement is measured by scanning said synchronizing areas with said spot and detecting the radiation of said beam which has been modulated by said synchronizing areas, and, in response to said measured speed, controlling the rate at which the information is written during said writing step.

3. The method according to claim 1 wherein said servo track between said first portions of adjacent sections comprises optically detectable elongated, spaced apart tracking areas, each tracking area having a plurality of optically detectable, uniformly spaced synchronizing areas, and wherein during said writing step the speed of said relative movement is measured by detecting the radiation of said beam coming from said record carrier which has been modulated by said synchronizing areas and in response to said measured speed controlling the rate at which the information is written on said radiation sensitive layer.

4. The method according to claims 1, 2 or 3, wherein said radiation sensitive layer is comprised of a material which undergoes an optically detectable change immediately upon exposure to said radiation at said second level, and including the step of reading the information written during said writing step by detecting variations in the intensity of the radiation of said beam coming from said record carrier and comparing the information which is read with the information to be written.

5. The method according to claim 1 wherein said record carrier body is provided with a plurality of generally parallel servo tracks, said radiation sensitive layer extending between adjacent servo tracks and wherein said writing step includes the step of projecting at least one additional radiation spot onto said radiation sensitive layer, said additional spot being spaced from said first named radiation spot a predetermined distance in a direction generally perpendicularly to the track direction and switching the intensity of the radiation of said additional spot independently of said first named spot and in accordance with the information to be written thereby so that an additional block of information is written by said additional spot simultaneously with that written by said first named spot.

6. A record carrier body for storing information recorded thereon in optically detectable form comprising a preformed, optically detectable, elongated servo track for guiding a beam of radiation, said servo track having a plurality of successive sections extending in the track direction, each section having a first portion containing a first plurality of preformed, optically detectable areas spaced from each other in the track direction and a second optically detectable portion provided with a radiation sensitive layer, said areas of said first plurality in each first portion of each section comprising address areas which define an address of said second portion of that section, and said second portion of a given section adjoining the first portion of an adjacent section so that said first and second portions alternate with each other in the track direction.

7. The record carrier body according to claim 6 wherein said areas of said first plurality in said first portions include a plurality of uniformly spaced, optically detectable synchronizing areas for modulating a beam of radiation with which the record carrier body is scanned in dependence on the speed of movement of the beam relative to the carrier body, said synchronizing areas being disposed at the beginning of said first portions.

8. A record body according to claim 6 wherein said servo track is a periodically undulating track, the phase of the undulations being related to the beginning of an address defined by said address areas, the amplitude of the undulation being smaller than the width of said servo track, and an integral number of periods of the undulation being contained in the length of the address defined by said address areas.

9. The record carrier body according to claim 6 including a plurality of generally parallel servo tracks, and wherein between adjacent first portions said servo track comprises optically detectable tracking areas spaced a constant distance from the tracking area of an adjacent servo track, said distance being substantially greater than the width of said tracking areas, and wherein said radiation sensitive layer extends between said tracking areas of adjacent servo tracks.

10. The record carrier body according to claim 9 wherein said tracking areas include a plurality of optically detectable, uniformly spaced synchronizing areas.

11. The record carrier according to claim 9 or 10 wherein said servo tracks are spaced from each other by a distance which is several times the width of said servo tracks so that a plurality of information tracks can be written between adjacent servo tracks.

12. The record carrier according to claim 6 wherein said address areas and said second portions define a phase structure and said radiation sensitive layer comprises a material which undergoes a change upon exposure to radiation which produces variations in the amplitude of the radiation with which the information recorded on said layer is read.

13. The record carrier body according to claim 6, wherein said body is disc-shaped and including a plurality of said servo tracks, said tracks being circular and extending about the center of said disc-shaped body to define concentric circles or turns of a spiral, and wherein said optically detectable areas are defined by spaced apart pits formed in the surface of said body and said second portion is a groove formed in said surface and extending in the track direction, said radiation sensitive layer extending over the bottom of said groove.

14. An apparatus for recording information on a record carrier body having a servo track comprised of a plurality of sections extending in the track direction, each section having a first portion containing optically detectable address areas and a second portion provided with a radiation sensitive layer, said address areas of said first portion in each section defining an address of said second portion of that section, said apparatus comprising a radiation source for producing a beam of radiation, means for switching the intensity of said radiation beam between a first level at which the intensity of said radiation is sufficient to produce an optically detectable change in said radiation sensitive layer and a second level at which the intensity of the radiation is insufficient to produce an optically detectable change in said radiation sensitive layer, means for focussing said radiation beam to a single spot on said record carrier body, means for moving said spot and said record carrier body relative to each other, means for detecting the radiation of said beam coming from said record carrier body, said detecting means producing a first electrical signal corresponding to variations in the intensity of the detected radiation, first circuit means for converting said first signal into an address signal and an information signal, a first address register connected to said first circuit means, a second register for storing a desired address, a first comparison circuit having a first input connected to said first address register and a second input connected to said second address register, second circuit means for deriving a control signal for positioning of said spot transverse to the track direction, means, including a lowpass filter, for connecting said second circuit means to said detecting means, and third circuit means for deriving a control signal for focussing of said radiation beam onto said record carrier body.

15. The apparatus according to claim 14 including means for checking the information recorded in said radiation sensitive layer during writing of the information, said checking means comprising said first circuit means, a normalizing circuit connected to an input of said first circuit means and having a first input connected to said detecting means and a second input for receiving a signal indicative of the intensity of the radiation emitted by said radiation source, a memory connected to an output of said first circuit, means for storing a block of information to be written, and a comparison circuit having a first input connected to said memory and a second input connected to said storage means.

16. The apparatus according to claim 15 wherein said radiation source is a diode laser and said switching means comprises means for switching an electric current applied to said diode laser, and wherein said detecting means includes a radiation sensitive detector disposed on the side of said diode laser which faces away from the record carrier body, and including means for applying to said second input of said normalizing circuit a signal which is proportional to the electric current through the diode laser.

17. The apparatus according to claim 15 wherein said radiation source is a diode laser and said detecting means includes means for determining the electrical resistance of said diode laser and means for applying to said second input of said normalizing circuit a signal which is proportional to the electric current through said diode laser.

18. The apparatus according to claim 14 including a plurality of additional radiation sources each producing a beam of radiation, means for switching the intensity of each beam produced by each of said additional sources between said first and second levels and a detector optically coupled to each of said additional sources.

19. A record carrier for storing information in optically detectable form comprising a disc-shaped substrate having on one side thereof a plurality of adjacent, spaced apart circular servo tracks for guiding a beam of radiation with which said tracks are scanned, said servo tracks extending about the center of said disc-shaped substrate and defining concentric circles or turns of a spiral, said servo tracks each having a plurality of successive sections extending in the track direction, each section having a first portion containing a first plurality of optically detectable areas spaced from each other in the track direction and a second portion having a second plurality of optically detectable areas spaced from each other in the track direction and containing the stored information, said areas of said first plurality in each first portion of each section comprising address areas which define an address of said second portion of that section, and said second portion of a given section adjoining the first portion of an adjacent section so that said first and second portions alternate with each other in the track direction.

20. An apparatus for recording information on a disc-shaped record carrier body having a plurality of adjacent, circular optically detectable servo tracks which are spaced from each other in the radial direction and which extend about the center of said disc-shaped body, each circular servo track having a plurality of sections extending in the track direction, each section having a first portion containing optically detectable address areas and a second portion provided with a radiation sensitive layer, said address areas of said first portion in each section defining an address of said second portion of that section, said apparatus comprising means for producing a single beam of radiation, means for switching the intensity of said radiation beam between a first level at which the intensity is sufficient to produce an optically detectable change in said radiation sensitive layer and a second level at which the intensity of the radiation is insufficient to produce an optically detectable change in said radiation sensitive layer, means for directing said radiation beam onto said record carrier, means for focusing said radiation beam to a spot on said record carrier body, means for moving said spot and said record carrier body relative to each other so that said spot scans a given servo track and is modulated by said address areas, means for detecting the modulated radiation coming from said record carrier body, said detecting means producing an electrical signal corresponding to variations in the intensity of the detected radiation, first means for deriving from said electrical signal, an address signal representative of a first address defined by said address areas scanned by said beam, means for comparing said address signal with a further signal representative of a desired address, said comparing means providing a first signal when said first address corresponds to said desired address, means responsive to said first signal for controlling said intensity switching means so that the intensity of said beam is switched between said first and second levels in accordance with the information to be recorded to thereby record the information in said second portion associated with said desired address, second means for deriving, from said electrical signal, a control signal indicative of radial displacement of said spot from the center of the servo track being scanned, means responsive to said control signal for maintaining said spot centered on said servo track being scanned, and third means for deriving, from said electrical signal, a further control signal representative of focusing error, and means for adjusting the position of said focusing means relative to said record carrier body in response to said further control signal so as to maintain said beam focused on the servo track being scanned.

21. The apparatus according to claim 20 wherein said first portion of each section has a plurality of optically detectable synchronizing areas which are uniformly spaced from each other, and said apparatus includes means for deriving, from said electrical signal, a second signal indicative of the speed of said relative moment between said spot and said record carrier body and means responsive to said second signal for controlling the speed of said relative movement.

* * * * *